US011176718B2

(12) United States Patent
Gilbertson et al.

(10) Patent No.: US 11,176,718 B2
(45) Date of Patent: Nov. 16, 2021

(54) ARRANGING DIRECTED ACYCLIC GRAPH DATA FOR DISPLAY

(71) Applicant: The Boeing Company, Chicago, IL (US)

(72) Inventors: Daniel David Gilbertson, Florissant, MO (US); Liessman E. Sturlaugson, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/845,759

(22) Filed: Apr. 10, 2020

(65) Prior Publication Data
US 2021/0319603 A1 Oct. 14, 2021

(51) Int. Cl.
*G06T 11/20* (2006.01)
*G06T 11/60* (2006.01)

(52) U.S. Cl.
CPC ............ *G06T 11/206* (2013.01); *G06T 11/60* (2013.01)

(58) Field of Classification Search
CPC ......... G06T 11/206; G06T 11/60; G06N 5/02; G06N 5/003; G06F 16/2246; G06F 16/322; G06F 16/9024; G06F 16/9027
See application file for complete search history.

(56) References Cited

U.S. PATENT DOCUMENTS

2008/0005628 A1\* 1/2008 Underdal ................. G06N 5/02
714/57

\* cited by examiner

*Primary Examiner* — Jennifer Mehmood
*Assistant Examiner* — Andrew Shin
(74) *Attorney, Agent, or Firm* — Alleman Hall Creasman & Tuttle LLP

(57) ABSTRACT

The disclosed examples relate to arranging graph data for display on a display device. One example provides, on a computing device, a method comprising determining one or more connected groups of nodes in directed acyclic graph data, for each connected group of nodes, determining a reachability from each node with no inputs to each of one or more nodes with no outputs to determine a plurality of initial node/terminal node pairs, and for each initial node/terminal node pair, determining a path from the initial node to the terminal node. The method further comprises initializing a grid based upon the determined paths, placing each node at a corresponding initial grid location, and placing edges between nodes based upon the determined paths to form an initial grid representation, modifying the initial grid representation via a cost function to form a modified grid representation, and outputting the modified grid representation for display.

20 Claims, 9 Drawing Sheets

| Function Node | Step Numbers | Median | Maximum |
|---|---|---|---|
| a | 1, 1, 1 | 1 | 1 |
| b | 1 | 1 | 1 |
| c | 2, 2, 2 | 2 | 2 |
| d | 2 | 2 | 2 |
| e | 1, 1, 2, 2, 3, 3 | 2 | 3 |
| f | 1, 1, 1 | 1 | 1 |

ARRANGING DIRECTED ACYCLIC GRAPH DATA FOR DISPLAY

FIELD

This invention relates to automatically arranging graph data for display on a display device.

BACKGROUND

Diagnostic systems development can involve the use of a visual representation of graph data, wherein graph data comprises nodes connected by edges. As examples, nodes can represent test conditions, functions, and failure modes, and edges between the modes can link test conditions to failure modes via functions that lie between the two.

However, some sets of graph data can be very large and highly connected, such as a diagnostic data graph for an aircraft. Current tools for visually representing graph data often generate complex clusters of nodes and edges that can be difficult to understand. Thus, in some cases, a user must spend potentially significant amounts of time rearranging the visual representation to make the data more understandable.

SUMMARY

Examples are disclosed herein that relate to arranging directed acyclic graph data for display on a display device. One example provides, on a computing device, a method for arranging directed acyclic graph data for display on a display device, the method comprising determining one or more connected groups of nodes in the directed acyclic graph data, for each connected group of nodes, determining a reachability from each node with no inputs to each of one or more nodes with no outputs to determine a plurality of initial node/terminal node pairs, and for each initial node/terminal node pair, determining a path from the initial node to the terminal node of the initial node/terminal node pair. The method further comprises initializing a grid based upon the determined paths for the connected groups of nodes, the grid comprising grid locations defined by intersections of grid lines along a first dimension and grid lines along a second dimension, placing each node at a corresponding initial grid location, and placing edges between nodes based upon the determined paths to form an initial grid representation, modifying the initial grid representation via a cost function by moving each of one or more nodes to form a modified grid representation based upon improving the cost function, and outputting the modified grid representation for display.

DETAILED DESCRIPTION

Figure 1:
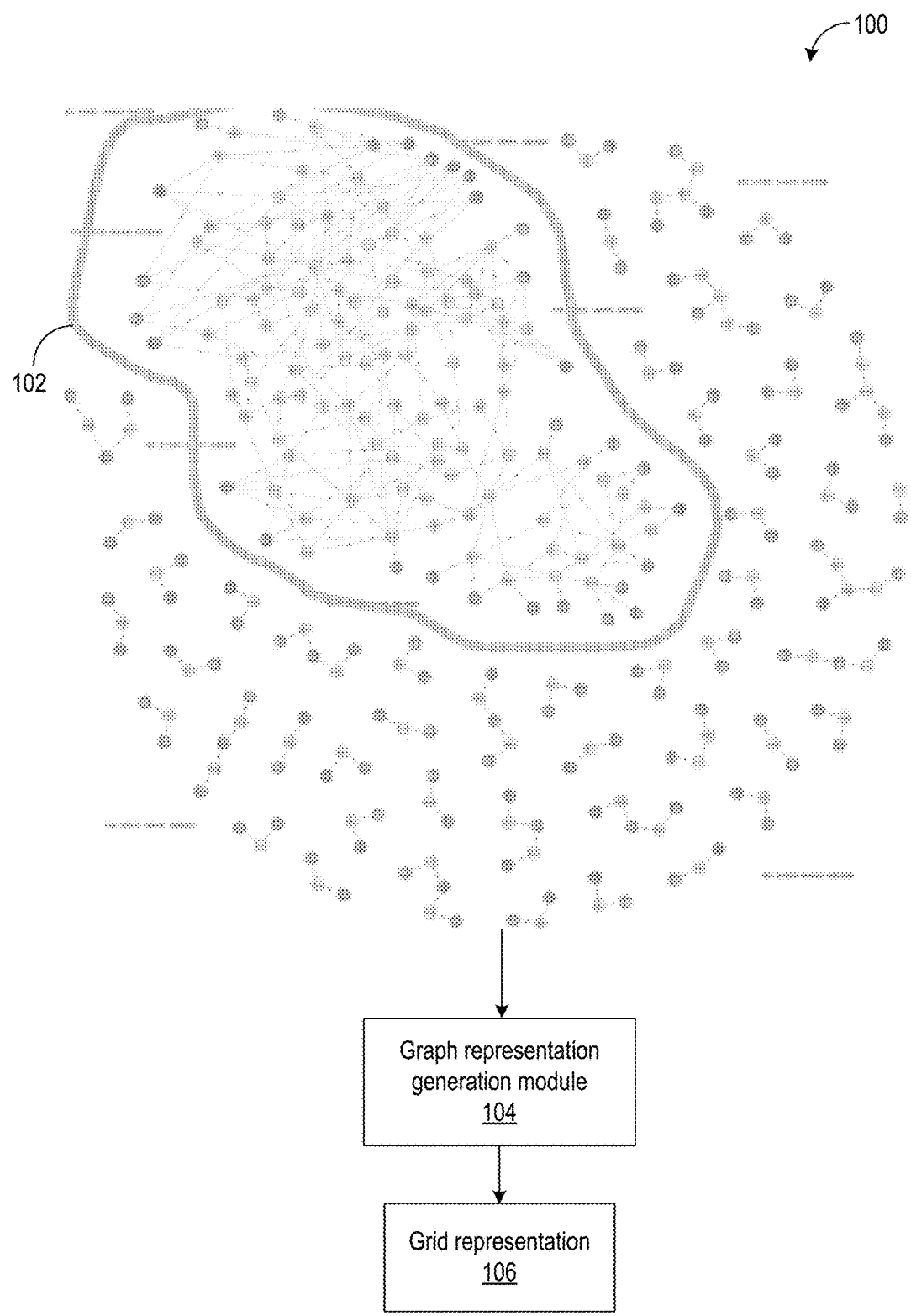
FIG. 1 shows a visual representation of graph data that can be input into an example graph representation generation module for arranging into a grid representation.

As mentioned above, experts who develop, inspect, and update diagnostic models can utilize some visual representation of graph data comprising diagnostic information to perform their tasks. The more difficult and time-consuming it is for an expert to generate a visual representation of the information and comprehend the content, the less productive and more error-prone the process can be. Current tools for automatically representing graph data can arrange a set of nodes and edges into one or more complex clustered balls of connected nodes that can be difficult to visually understand. FIG. 1 shows an example visual representation of nodes and edges for a set of graph data 100 stored on a computing device. The visual representation of FIG. 1 can be generated by a standard graph viewer, as an example. Where graph data 100 represents diagnostic data, the graph data can include test nodes, function nodes, and failure mode nodes, as examples.

The graph data 100 includes ambiguity groups, which are groups of nodes to which a given fault is isolated, but any one of which can be the source of the fault. The outline 102 outlines a highly clustered group of nodes with a number of contained ambiguity groups. For a user interpreting the visual representation of the graph data 100, it can be difficult to visually follow the connections and understand where the ambiguity groups actually are and how the failure modes, functions, and tests are related. It can also be challenging, complex, and time-consuming to manually move the nodes around on a display (e.g. via a graphics editor) until the relationships are visually comprehensible.

Accordingly, the disclosed examples relate to automatically arranging directed acyclic graph data for display on a display device to produce a representation that is easier to visually interpret compared to conventional visual representations of graph data. Briefly, node types (which, for diagnostic data, can include failure mode, function, and/or test nodes) are arranged, via a computer-implemented graph representation generation module 104, into a grid representation 106 that visually represents directed acyclic graph data as extending along a direction of the grid. The rearrangement of graph data is a problem that is known to be NP-hard, meaning there is no known algorithm that can efficiently solve this problem for any graph to generate a clear graph. Nevertheless, the examples disclosed herein automatically generate a graph representation that is more easily visually interpreted by a user than that generated by general-purpose graph layout approximation algorithms provided by current tools. The examples disclosed herein can thereby save a user from having to manually rearrange an initial visual arrangement of nodes, which can take potentially hours of time and waste computational resources. The grid representations produced as disclosed herein can be utilized to create diagnostic models used in on-board runtime diagnostics (e.g. for aircraft or other vehicles), as well as for any other suitable application. Example grid representations, as well as an example diagnostic model, are disclosed in more detail below.

Figure 2A:
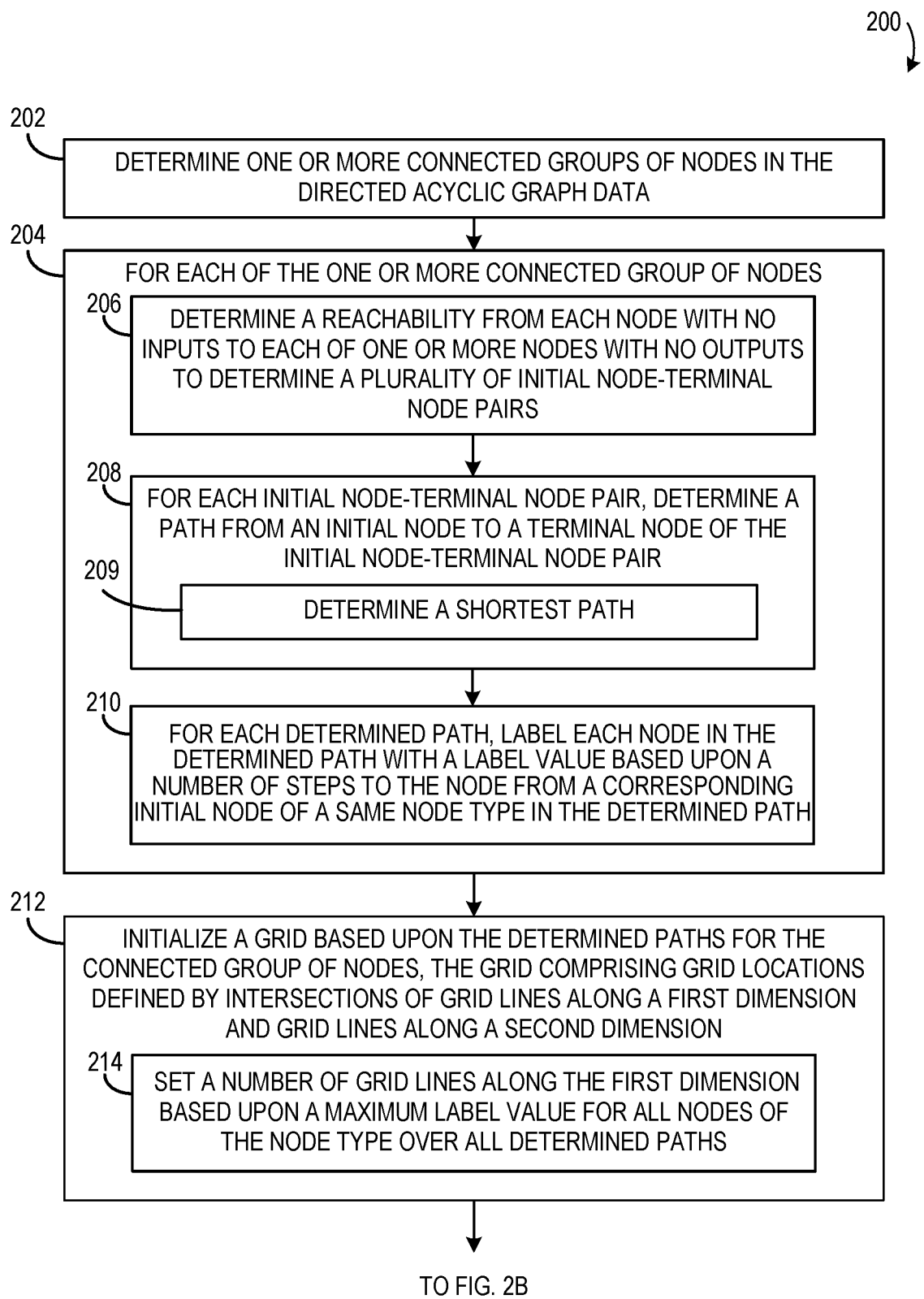
FIGS. 2A-B show an example method of arranging graph data for display on a display device.
Figure 2B:
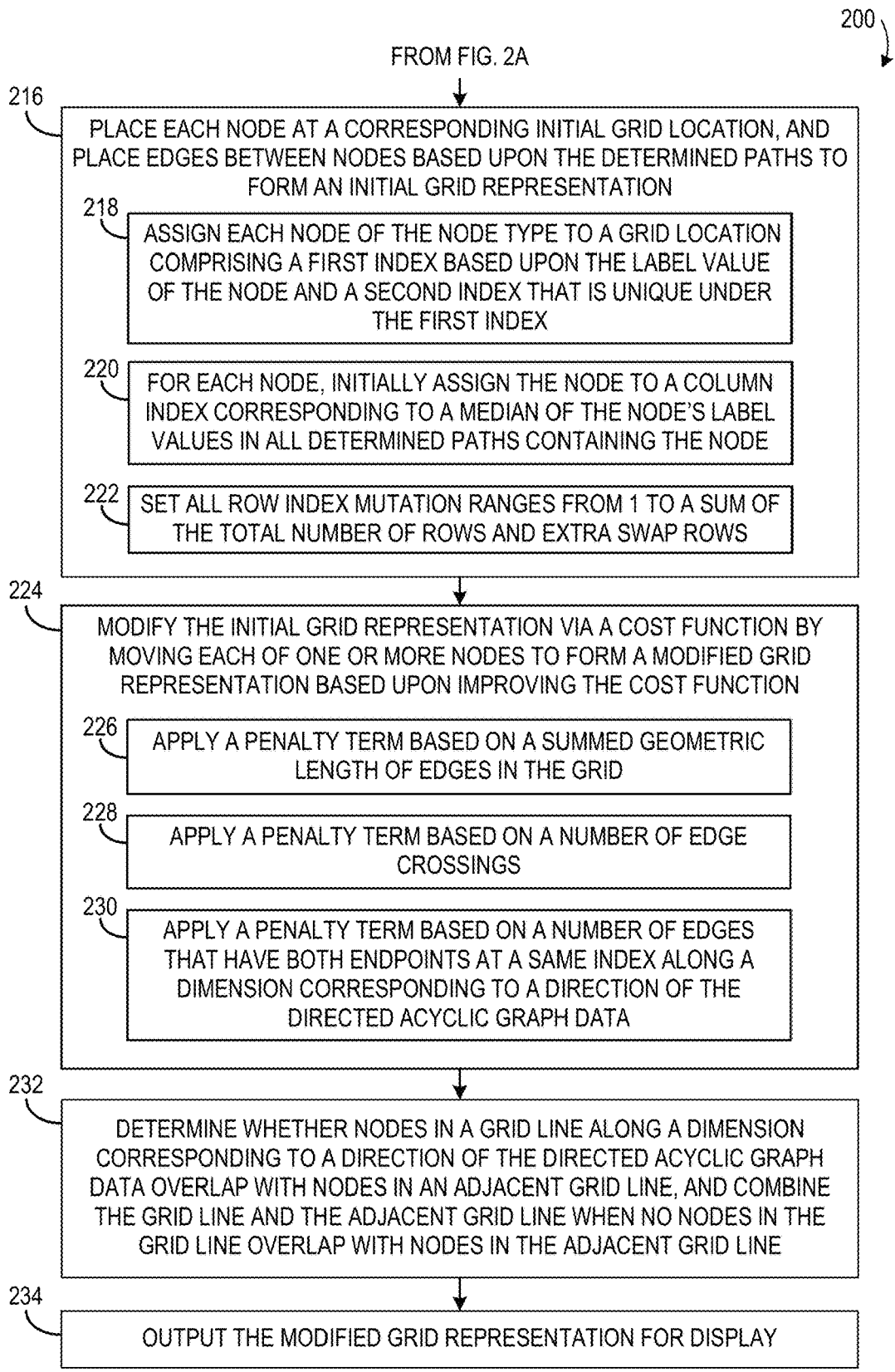

FIGS. 2A-B show a flow diagram depicting an example method 200 of arranging directed acyclic graph data for display on a display device. Method 200 can be implemented by the graph representation generation module 104 of FIG. 1 via computing system 1100 of FIG. 11 (described below), for example. A directed graph includes nodes connected by edges having a direction associated with them, and an acyclic graph is one having each edge directed from one node to another such that there is no way to start at any node n and follow a consistently-directed sequence of edges that eventually loops back to n again. The directed acyclic graph data can be diagnostic data, as an example. Method 200 can be performed on any suitable computing device.

First, in a group identification phase, method 200 includes, at 202, determining one or more connected groups of nodes in the directed acyclic graph data. Each connected group of nodes can include one or more node types, for example, test, function, and failure mode node types for diagnostic data. Group identification can further include determining ambiguity groups of test, function, and failure mode node types that have nodes in common. Ambiguity group analysis determines groups of connected nodes, and is based on finding isolated sets of nodes as if the graph were an undirected graph. An identification of isolated groups of nodes is made with the result that each isolated group is called an ambiguity group in diagnostic analysis. An isolated group can comprise test, function, and/or failure mode node types.

Figure 3:
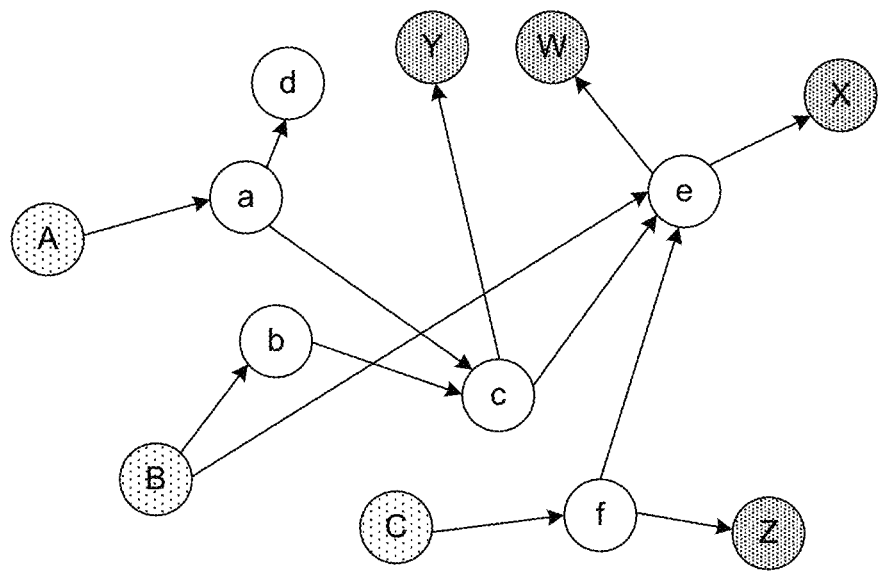
FIG. 3 schematically shows a visual representation of a connected group of nodes as a cluster.

Next, in a grid initialization phase, method 200 includes, at 204, for each connected group of nodes, at 206, determining a reachability from each node with no inputs to each of one or more nodes with no outputs, to determine a plurality of initial node/terminal node pairs. Reachability refers to the ability to get from one node to another node within the graph. FIG. 3 schematically shows an example of a starting connected group of nodes. Nodes A, B and C represent test nodes, nodes a, b, c, d, e and f represent function nodes, and nodes W, X, Y and Z represent failure mode nodes. In this example, test nodes A, B and C are nodes with no inputs, and failure mode nodes X, W, Y and Z are nodes with no outputs. Reachability can be determined using any suitable algorithm, including, but not limited to, the Floyd-Warshall algorithm.

Figure 4:
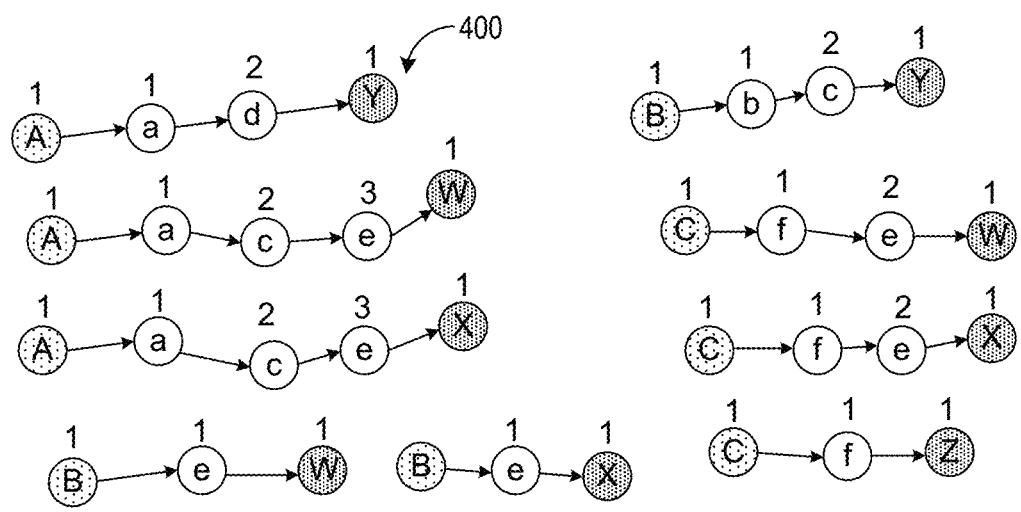
FIG. 4 schematically shows shortest paths determined for the example connected group of nodes of FIG. 3.

Further during the grid initialization phase, method 200 includes, at 208, for each initial node/terminal node pair, determining a path from the initial node to the terminal node. In some examples, a shortest path can be determined from the initial node to the terminal node, as shown at 209. FIG. 4 shows example shortest paths determined for the connected group of nodes of FIG. 3. Shortest paths can be determined using any suitable algorithm, such as, but not limited to, Dijkstra's algorithm. Shortest paths can help to identify initial candidate locations for nodes in a grid. In other examples, instead of determining shortest paths, other paths can be determined for each initial node/terminal node pair. For example, an approximation of a minimum Steiner tree between all test and all failure mode nodes can be determined. As a further example, a minimum spanning tree can be computed over all of the nodes.

Figures 5, 6:
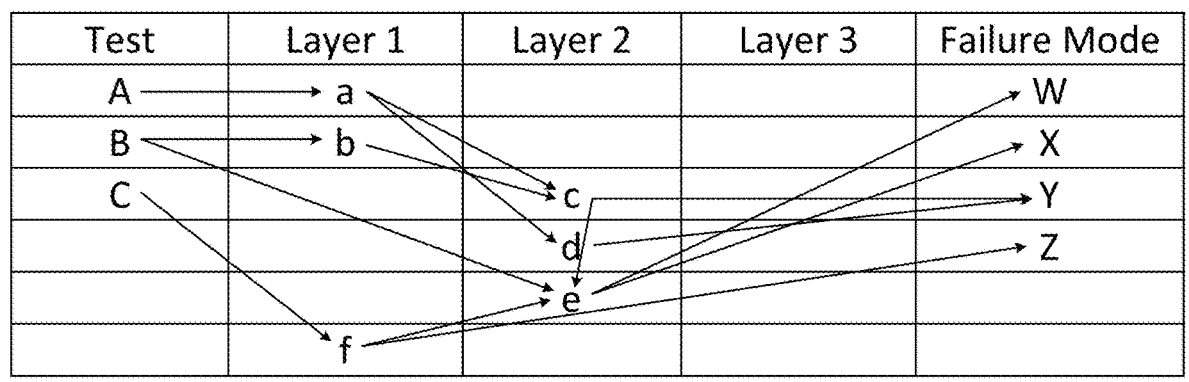
FIG. 5 shows a table comprising example data for the shortest paths of FIG. 3.
FIG. 6 shows an example initialized grid representation for the connected group of nodes of FIG. 3.

Method 200 further includes, at 210, for each determined path, labeling each node in the determined path with a label value based upon a number of steps to the node from a corresponding initial node of a same node type in the determined path. As one example, for each node type, each node can be labeled with a number corresponding to the distance from the first node of that node type to said node, starting at a distance of 1 for each node type. For example, in FIG. 4, in the shortest path 400, for the function nodes a and d, function node a is labeled "1," as it is the first of the function nodes in the shortest path 400, and function node d is labeled "2," as it is the second of the function nodes in the shortest path 400. FIG. 5 shows a table summarizing example data for the determined shortest paths, including step numbers, median values of the step numbers, and maximum values per function node based on the shortest paths of FIG. 3 and FIG. 4. As another example, where the paths are determined from a Steiner tree, on each path in the Steiner tree from each test node to each failure mode node, each function node can be labeled as the number of steps from the test node to that node. The remaining function nodes can be labeled with a random position within the minimum/maximum range of previously labeled positions. As yet another example, where a minimum spanning tree is computed over all nodes, each path in the minimum spanning tree from each test node to each function node, each function node can be labeled as the number of steps from the test node to that node.

Next, method 200 includes, at 212, initializing a grid based upon the determined paths for the connected group of nodes, the grid comprising grid locations defined by intersections of grid lines along a first dimension and grid lines along a second dimension. For example, the grid can be initialized by setting, for each node type, a number of grid lines along a first dimension (e.g. a number of column grid lines arranged along a horizontal direction) based upon a maximum label value for all nodes of the node type over all determined paths, as shown at 214. In the example of FIG. 4, the maximum label value for all test nodes is "1," the maximum label value for all function nodes is "3," and the maximum label value for all failure mode nodes is "1." Thus, an initialized grid for the shortest paths of FIG. 4 can include 1 column for the test nodes, 3 columns for the function nodes, and 1 column for the failure mode nodes.

Method 200 further includes, at 216, placing each node at a corresponding initial grid location, and placing edges between nodes based upon the determined paths to form an initial grid representation. Placing each node at a corresponding initial grid location can include, at 218, assigning each node of the node type to a grid location comprising a first index (e.g. column) based upon the label value of the node, and a second index (e.g. row) that is unique under the first index. The use of row and column are for one example index type, and row and column could be interchanged for any other suitable index notation. In such an example, nodes can be initially assigned to a column index corresponding to the median of all the node's label values in all determined paths containing the node, as shown at 220. For example, returning to FIG. 5, nodes a, b and f can be initially assigned to column 1, and nodes c, d and e can be initially assigned to column 2 in the initial grid representation. As another illustrative example, nodes can be initially assigned to a column index corresponding to the maximum value of all the node's label values in all determined paths containing the node. In such an example, nodes a, b and f can be initially assigned to column 1, nodes c and d can be initially assigned to column 2, and node e can be initially assigned to column 3 in an initial grid representation, based on the maximum values shown in FIG. 5. Method 200 also includes, at 222, setting all row index mutation ranges from 1 to a sum of the total number of rows and extra swap rows. As explained in more detail below, after initializing the grid representation, nodes are moved between grid locations based upon a cost function. Thus, the row index mutation range provides a range of row indices that can be assigned to a node.

FIG. 6 shows an example initialized grid 600 for the connected group of nodes of FIG. 3. In this example, each of the function nodes is initially assigned to a column index corresponding to the median of the node's labels in all shortest paths containing that node. The column index mutation range is set to a minimum/maximum of the node's labels, each node assigned to its own row index within its node type, and all row index mutation ranges are set from 1 to a sum of the total number of rows and extra swap rows. In other examples, the initialization into rows and columns as described above may instead be performed such that the row indices in the example above are swapped with column indices, resulting in a graph that is read along a direction of the columns instead of along a direction of the rows. In further examples, a column or row mutation range may be set to any other suitable values, such as a range that extends beyond the node's minimum and/or maximum labels.

As mentioned above, after the nodes in the connected group of nodes are placed into initialized locations on the initialized grid, the initialized grid is modified in a modification phase. Thus, continuing with FIG. 2B, method 200 includes, at 224, modifying the initial grid representation via a cost function by moving each of one or more nodes to form a modified grid representation based upon improving the cost function. In one example, test, function, or failure mode nodes within a same row can be swapped or moved to an empty row independent from the other node types in the row. Further, in some examples, individual function nodes can be moved to any empty column based on either the minimum or the maximum of all determined paths running through that node, or based upon any other suitable factors.

Any suitable cost function can be used. In some examples, a cost function can include one or more of a penalty term based upon a summed geometric length of edges in the grid, a penalty term based upon a number of edge crossings in the grid, and/or a penalty term based upon whether any edges have both endpoints at a same index along a dimension corresponding to a direction of the directed acyclic graph data. The cost function can be reduced using a metaheuristic algorithm (e.g. particle swarm optimization, genetic algorithms, simulated annealing) to search for a modified grid.

Thus, continuing with FIG. 2B, modifying the initial grid representation via a cost function can include, at 226, applying a penalty term $P_{geometric}$ based on a summed geometric length of edges in the grid, where $P_{geometric}$=sum of the geometric length of all edges in the graph. An example equation for calculating the length of an edge from a start node s1 to an end node e2 is as follows:

$$\text{Length}(s1, e2) = \sqrt{(s1 \cdot \text{row} - e2 \cdot \text{row})^2 + (s1 \cdot \text{col} - e2 \cdot \text{col})^2}$$

As another example, an approximation with less computational cost can be based on row differences, such that Length $(s1,e2)=s1.row-e2.row$ Additionally or alternatively, modifying the initial grid representation via a cost function can include, at 228, applying a penalty term $P_{edge}$ equal to a number of edge crossings. For example, given two node pairs (s1, e1) and (s2, e2), it is determined if line segment 1 defined by (s1.row, s1.col) to (e1.row, e1.col) overlaps with line segment 2 defined by (s2.row, s2.col) to (e2.row, e2.col). As another example, the row positioning for the nodes of a constrained column set can be checked by determining if a start node s2 is in a same or an earlier column as s1 and an end node e2 is after s1, and start node s2 is above s1 and end node e2 is below e1, or start node s2 is below s1 and end node e2 is above e1.

Additionally or alternatively, modifying the initial grid representation via a cost function can include, at 230, applying a penalty term $P_{column}$ based on whether any edges have both endpoints at a same index along a dimension corresponding to a direction of the directed acyclic graph data, e.g. both endpoints in a same column, where $P_{column}=\infty$, denoting that such an occurrence is unacceptable.

The cost function can be defined, for example as $P_{sum}$=Constant1×$P_{geometric}$+$P_{column}$+Constant3×$P_{edge}$ where Constant1 and Constant3 are suitable constants relating to a penalty calculation method. The $P_{column}$ term is used primarily to remove any grid layouts in which an edge goes through another node. In other examples, a curved arrow line can go around a node, in which case a Constant2 can be multiplied with $P_{geometric}$ (Constant2×$P_{column}$), wherein Constant2 is dependent on the edge drawing method selected. The cost function parameters above can be user-selectable parameters. The user can also have the ability to select starting from a higher node versus a lower node in applying the cost function.

Figures 7, 8:
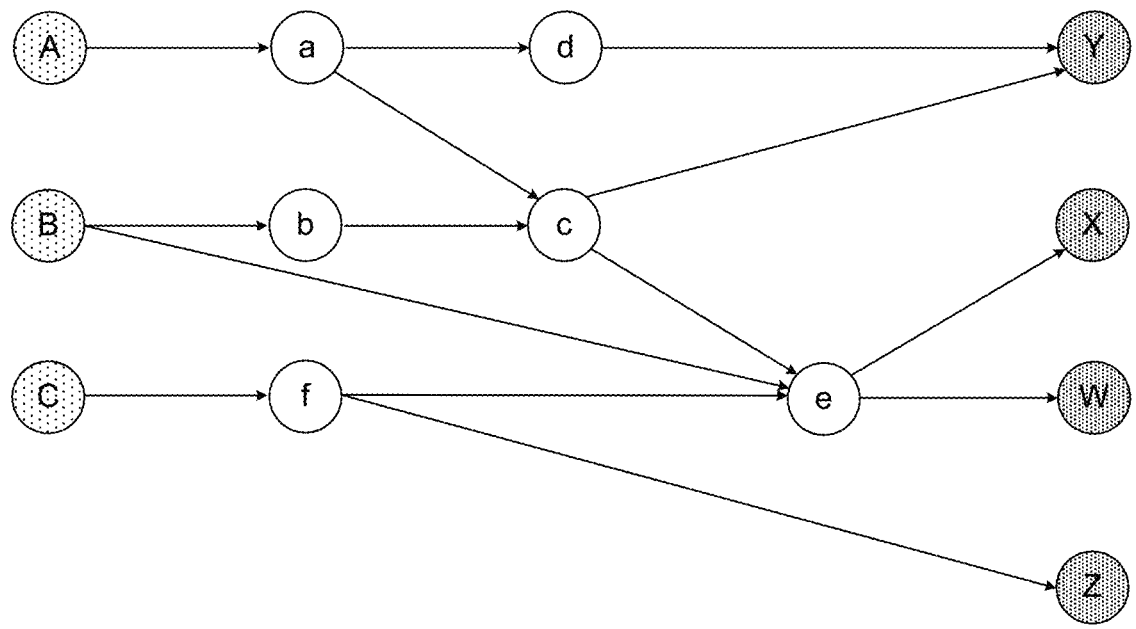
FIG. 7 shows an example modified grid representation generated from the initialized grid of FIG. 6.
FIG. 8 shows a final grid representation generated from the modified grid representation of FIG. 7.

As a specific example, the cost function can be calculated as $P_{sum}$=1×$P_{geometric}$+$P_{column}$2×$P_{edge}$ A resulting modified grid representation can be a grid layout for which $P_{sum}$ is suitably low (e.g. below a threshold), or converges to a determined local or global minimum, where the determined local or global minimum may not correspond to an actual local or global minimum. FIG. 7 shows an example modified grid 700 resulting from applying an example cost function to the initial grid 600.

Figure 9:
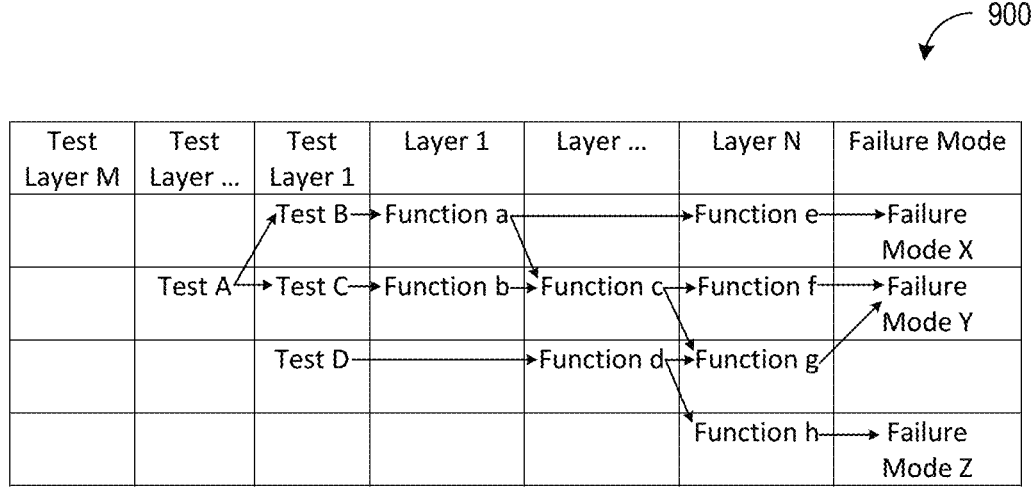
FIG. 9 shows an example grid representation for a different connected group of nodes.
Figure 10:
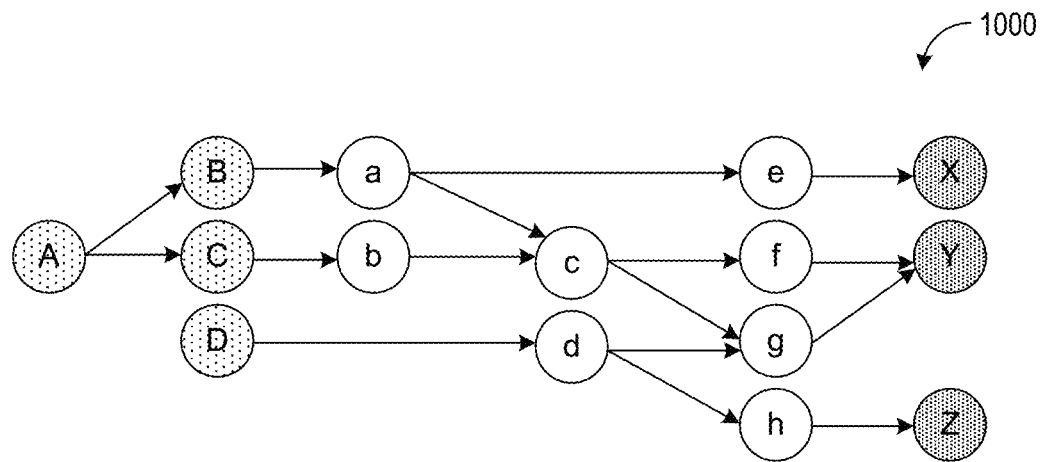
FIG. 10 shows a final grid representation generated from the grid representation of FIG. 9.

In some examples, the modified grid representation can be further simplified in a post-processing phase. As such, method 200 can further include, at 232, determining whether nodes in a grid line along a dimension corresponding to a direction of the directed acyclic graph data (e.g. a row) overlap with nodes in an adjacent grid line (e.g. an adjacent row), and combining the grid line and the adjacent grid line when no nodes in the grid line overlap with nodes in the adjacent grid line. If a current row is able to be combined with an adjacent row, then it is determined first whether the newly combined row can be combined with an adjacent row, before moving to the next row. FIG. 8 shows a final grid representation 800 of the modified grid 700 in which rows have been combined where possible. FIG. 9 shows another example grid representation 900 for a different connected group of nodes, and FIG. 10 shows a final grid representation 1000 of the grid representation of FIG. 9. Grid representation 900 is an example of graph data having more than one layer of test nodes.

Continuing with FIG. 2B, method 200 further includes, at 234, outputting the modified grid representation for display. Grid representation 800 and grid representation 1000 are examples of grid representations that can be displayed via a display device. Further, a grid representation also can be displayed with gridlines in some examples, such as shown in FIGS. 7 and 9. As described above, the resulting grid representations save time and computing resources compared to graph representations provided by current tools, as they are visually comprehensible and allow a user to more easily trace paths along a direction (e.g. left-to-right, right-to-left, vertical, etc.) within the grid, saving a user from having to open a graphic editor or other application on a computing device to manually rearrange nodes. For example, nodes of a type are put in a grid coordinate (x horizontal or y vertical), which aligns similar concept nodes with each other, thereby helping visual comprehension of the nodes.

Figure 11:
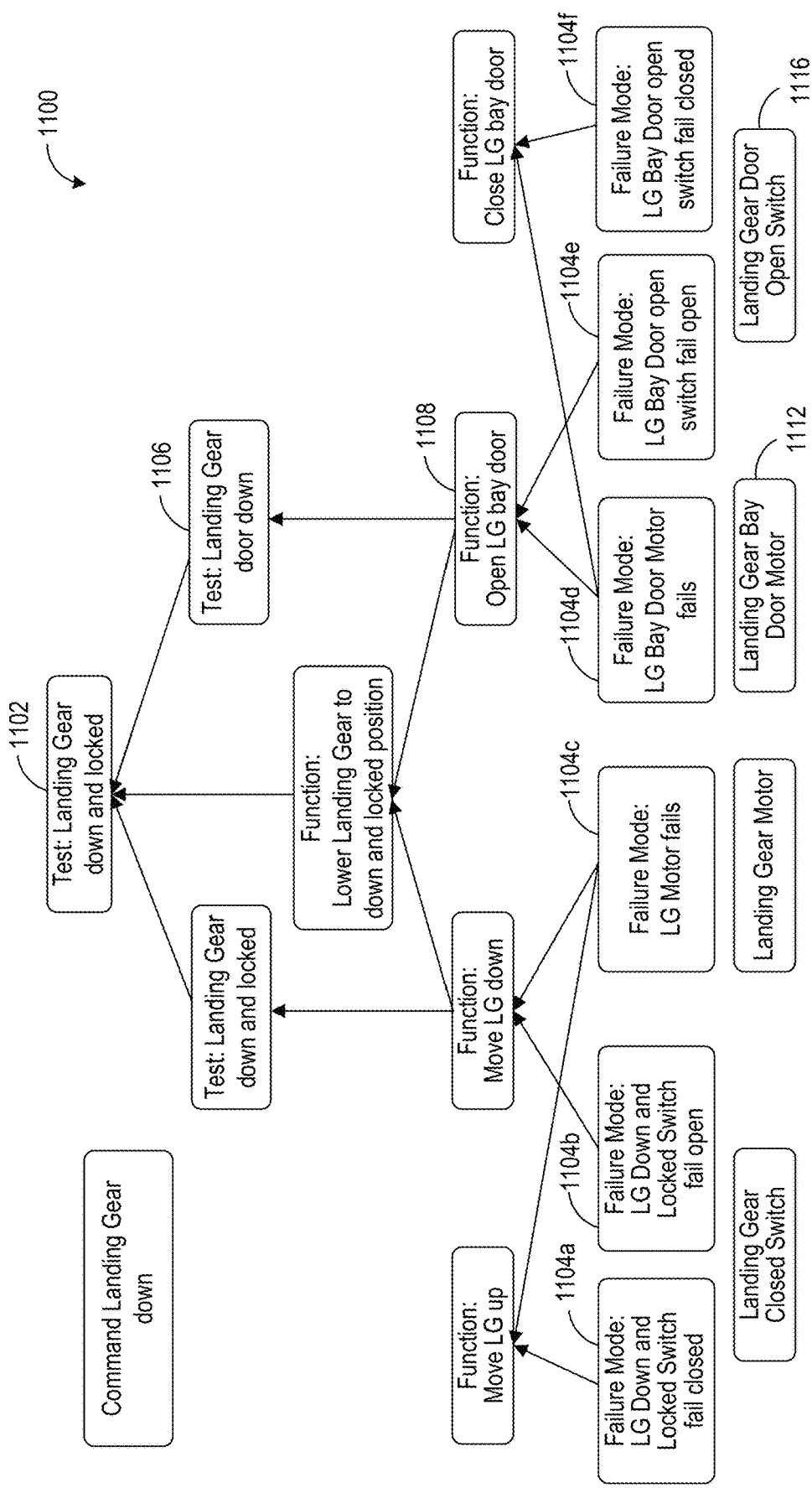
FIG. 11 shows an example diagnostic model that can be created using grid representations produced as disclosed herein.

As mentioned above, the grid representations produced as disclosed herein can be utilized to create diagnostic models used in on-board runtime diagnostics, such as for aircraft. FIG. 11 schematically shows an example diagnostic model 1100 for a landing gear down command for an aircraft. Diagnostic model 1100 depicts various example relationships among test, function, and failure mode nodes related to this command. For example, a failure of a test for determining whether landing gear is locked or down 1102 may arise from a number of different failure modes, represented by failure modes 1104a-1104f. However, the number of failure modes that could be responsible for the detected test failure can be narrowed by determining, at test node 1106, whether the landing gear door is down, which is dependent upon function "open landing gear bay door" 1108. From here, it can be determined whether the fault lies with a failure 1104d of the landing gear bay door motor 1112, or a failure 1104e of the landing gear door open switch 1116. Diagnostic model 1100 is a non-limiting example of a model that can be created using the grid representations (e.g. any of FIGS. 6-10) generated by the methods (e.g. method 200) disclosed herein. It will be understood that diagnostic model 1100 is presented for the purpose of illustration, and may not reflect a diagnostic model for a similar function implemented on an aircraft, which may be much more complex.

In some embodiments, the examples described herein can be tied to a computing system of one or more computing devices. In particular, such methods and processes can be implemented as a computer-application program or service, an application-programming interface (API), a library, and/or other computer-program product.

Figure 12:
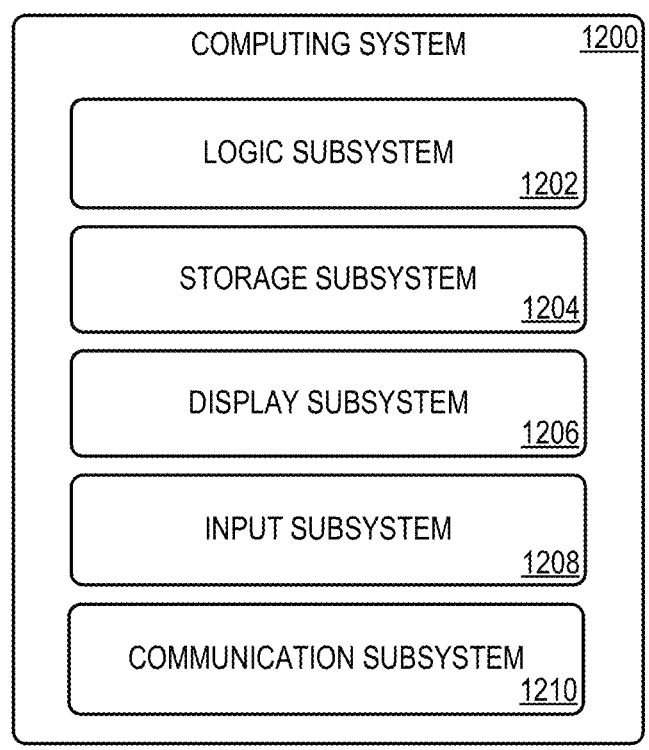
FIG. 12 shows a block diagram of an example computing system.

FIG. 12 schematically shows a non-limiting embodiment of a computing system 1200 that can enact one or more of the examples described above. For example, computing system 1200 can be used to execute instructions to implement graph representation generation module 104, to perform method 200, and to generate, display, and potentially perform other functions with the example graph data representations of FIGS. 3-10. Computing system 1200 is shown in simplified form. Computing system 1200 can take the form of one or more personal computers, server computers, tablet computers, home-entertainment computers, network computing devices, gaming devices, mobile computing devices, mobile communication devices (e.g., smart phone), a computing system integrated with or otherwise provided on an aircraft or other vehicle, and/or other computing devices.

Computing system 1200 includes a logic subsystem 1202, a storage subsystem 1204, and a display subsystem 1206. Computing system 1200 can optionally include an input subsystem 1208, a communication subsystem 1210, and/or other components not shown in FIG. 12.

Logic subsystem 1202 includes one or more physical devices configured to execute instructions. For example, logic subsystem 1202 can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result. For example, logic subsystem 1202 can be used to execute instructions to implement graph representation generation module 104, to perform the steps of method 200, and/or to generate and display any of the example graph data representations of FIGS. 3-10.

Logic subsystem 1202 can include one or more processors configured to execute software instructions. Additionally or alternatively, logic subsystem 1202 can include one or more hardware or firmware logic machines configured to execute hardware or firmware instructions. Processors of logic subsystem 1202 can be single-core or multi-core, and the instructions executed thereon can be configured for sequential, parallel, and/or distributed processing. Individual components of logic subsystem 1202 optionally can be distributed among two or more separate devices, which can be remotely located and/or configured for coordinated processing. Aspects of logic subsystem 1202 can be virtualized and executed by remotely accessible, networked computing devices configured in a cloud-computing configuration.

Storage subsystem 1204 includes one or more physical devices configured to hold instructions executable by logic subsystem 1202 to implement the methods and processes described herein. For example, storage subsystem 1204 can hold instructions executable to implement graph representation generation module 104, to perform method 200, and/or to generate and display any of the graph data representations of FIGS. 3-10. When such methods and processes are implemented, the state of storage subsystem 1204 can be transformed—e.g., to hold different data.

Storage subsystem 1204 can include removable and/or built-in devices. Storage subsystem 1204 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1204 can include volatile, nonvolatile, dynamic, static, read/write, read-only, random-access, sequential-access, location-addressable, file-addressable, and/or content-addressable devices.

It will be appreciated that storage subsystem 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1202 and storage subsystem 1204 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 1206 can be used to present a visual representation of data held by storage subsystem 1204. This visual representation can take the form of a graphical user interface (GUI). As the herein described methods and processes change the data held by the storage subsystem 1204, and thus transform the state of the storage machine, the state of display subsystem 1206 can likewise be transformed to visually represent changes in the underlying data. For example, display subsystem 1206 can be configured to display the graph data representations of FIGS. 3-10 as produced by graph representation generation module 104 and/or method 200. Display subsystem 1206 can include one or more display devices utilizing virtually any type of technology. Such display devices can be combined with logic subsystem 1202 and/or storage subsystem 1204 in a shared enclosure, or such display devices can be peripheral display devices.

When included, input subsystem 1208 can comprise or interface with one or more user-input devices such as a keyboard, mouse, touch screen, or game controller. In some embodiments, the input subsystem 1208 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, input subsystem 1208 can be configured to receive user inputs while implementing graph representation generation module 104, performing method 200 and/or displaying the graph data representations of FIGS. 3-10.

When included, communication subsystem 1210 can be configured to communicatively couple computing system 1200 with one or more other computing devices. Communication subsystem 1210 can include wired and/or wireless communication devices compatible with one or more different communication protocols. As non-limiting examples, the communication subsystem can be configured for communication via a wireless telephone network, or a wired or wireless local- or wide-area network. In some embodiments, communication subsystem 1210 can allow computing system 1200 to send and/or receive messages to and/or from other devices via a network such as the Internet. For example, communication subsystem 1210 may be used receive or send graph data and/or graph representations to another computing system. As another example, communication subsystem may be used to communicate with other computing systems during execution of method 200 in a distributed computing environment.

Further, the disclosure comprises embodiments according to the following clauses:

Clause 1. On a computing device, a method, the method comprising determining one or more connected groups of nodes in directed acyclic graph data, for each of the one or more connected group of nodes, determining a reachability from each node with no inputs to each of one or more nodes with no outputs to determine a plurality of initial node-terminal node pairs, and for each initial node-terminal node pair, determining a path from an initial node to a terminal node of the initial node-terminal node pair, initializing a grid based upon the determined paths for the connected groups of nodes, the grid comprising grid locations defined by intersections of grid lines along a first dimension and grid lines along a second dimension, placing each node at a corresponding initial grid location, and placing edges between nodes based upon the determined paths to form an initial grid representation, modifying the initial grid representation via a cost function by moving each of one or more nodes to form a modified grid representation based upon improving the cost function, and outputting the modified grid representation for display.

Clause 2. The method of clause 1, wherein each of the one or more connected group of nodes comprises one or more node types.

Clause 3. The method of any of clauses 1 or 2, wherein the directed acyclic graph data comprises diagnostic data, and the one or more node types include one or more of test nodes, function nodes, and failure mode nodes.

Clause 4. The method of any of the preceding clauses, further comprising, for each determined path, labeling each node in the determined path with a label value based upon a number of steps to the node from a corresponding initial node of a same node type in the determined path, wherein initializing the grid comprises, for each node type of the one or more node types, setting a number of grid lines along the first dimension based upon a maximum label value for all nodes of the node type over all determined paths, and wherein placing each node at the corresponding initial grid location comprises assigning each node of the node type to a grid location comprising a first index based upon the label value of the node and a second index that is unique under the first index.

Clause 5. The method of any of the preceding clauses, wherein modifying comprises applying a penalty term based on a summed geometric length of edges in the grid.

Clause 6. The method of any of the preceding clauses, wherein modifying comprises applying a penalty term based on a number of edge crossings.

Clause 7. The method of any of the preceding clauses, wherein modifying comprises applying a penalty term based on a number of edges that have both endpoints at a same index along a dimension corresponding to a direction of the directed acyclic graph data.

Clause 8. The method of any of the preceding clauses, wherein the improving of the cost function comprises a metaheuristic algorithm.

Clause 9. The method of any of the preceding clauses, further comprising determining whether nodes in a grid line along a dimension corresponding to a direction of the directed acyclic graph data overlap with nodes in an adjacent grid line, and combining the grid line and the adjacent grid line when no nodes in the grid line overlap with nodes in the adjacent grid line.

Clause 10. A computing device, comprising one or more processors, and storage comprising instructions executable by the one or more processors to obtain directed acyclic graph data, determine one or more connected groups of nodes, wherein each connected group of nodes comprises one or more node types, for each of the one or more connected group of nodes, determine a reachability from each node with no inputs to each of one or more nodes with no outputs to determine a plurality of initial node/terminal node pairs, and for each initial node-terminal node pair, determine a path from an initial node to a terminal node of the initial node-terminal node pair, initialize a grid based upon the determined paths, the grid comprising grid locations defined by intersections of grid lines along a first dimension and grid lines along a second dimension, place each node at a corresponding initial grid location, and place edges between nodes based upon the determined paths to form an initial grid representation, modify the initial grid representation via a cost function by moving each of one or more nodes to a different grid location to form a modified grid representation based upon improving the cost function, and output the modified grid representation for display.

Clause 11. The computing device of clause 10, wherein the directed acyclic graph data comprises diagnostic data, and wherein each of the one or more connected group of nodes comprises one or more of test nodes, function nodes, and failure mode nodes.

Clause 12. The computing device of any of clauses 10 or 11, wherein the instructions are further executable to, for each determined path, label each node in the determined path with a label value based upon a number of steps to the node from a corresponding initial node of a same node type in the determined path, wherein the instructions executable to initialize the grid are executable to, for each node type, set a number of grid lines along the first dimension based upon a maximum label value for all nodes of the node type over all determined paths, and wherein the instructions executable to place each node at the corresponding initial grid location are executable to assign each node of the node type to a grid location comprising a first index based upon the label value of the node and a second index that is unique under the first index.

Clause 13. The computing device of any of clauses 10, 11 or 12, wherein the instructions are executable to modify by applying a penalty term based on a summed geometric length of edges in the grid.

Clause 14. The computing device of any of clauses 10, 11, 12 or 13, wherein the instructions are executable to modify by applying a penalty term based on a number of edge crossings.

Clause 15. The computing device of any of clauses 10, 11, 12, 13 or 14, wherein the instructions are executable to modify by applying a penalty term based on edges having endpoints in a same index along a dimension corresponding to a direction of the directed acyclic graph data.

Clause 16. The computing device of any of clauses 10, 11, 12, 13, 14 or 15, wherein the instructions are further executable to determine whether nodes in a grid line along a dimension corresponding to a direction of the directed acyclic graph data overlap with nodes in an adjacent grid line, and combine the grid line and the adjacent grid line when no nodes in the grid line overlap with nodes in the adjacent grid line.

Clause 17. A computer-readable storage device comprising instructions that are executable by a computing device to obtain directed acyclic diagnostic graph data, the directed acyclic diagnostic graph data comprising nodes comprising one or more of test nodes, function nodes, and failure mode nodes, determining one or more connected groups of nodes, for each connected group of nodes, determine a reachability from each node with no inputs to each of one or more nodes with no outputs to determine a plurality of initial node/terminal node pairs, and for each initial node-terminal node pair, determine a path from an initial node to a terminal node of the initial node-terminal node pair, initialize a grid based upon the determined paths, the grid comprising grid locations defined by intersections of grid lines along a first dimension and grid lines along a second dimension, place each node at a corresponding initial grid location, and place edges between nodes based upon the determined paths to form an initial grid representation, modify the initial grid representation via a cost function by moving each of one or more nodes to a different grid location to form a modified grid representation based upon improving the cost function, and output the modified grid representation for display.

Clause 18. The computer-readable storage device of clause 17, wherein the instructions are further executable to, for each determined path, label each node in the determined path with a label value based upon a number of steps to the node from a corresponding initial node of a same node type in the determined path, wherein the instructions executable to initialize the grid comprises, for each node type, setting a number of grid lines along the first dimension based upon a maximum label value for all nodes of the node type over all determined paths, and wherein placing each node at the corresponding initial grid location comprises assigning each node of the node type to a grid location comprising a first index based upon the label value of the node and a second index that is unique under the first index.

Clause 19. The computer-readable storage device of any of clauses 17 or 18, wherein the instructions are executable to modify by applying one or more of a first penalty term based on a summed geometric length of edges in the grid, a second penalty term based on a number of edge crossings, and a third a penalty term based on edges having endpoints in a same index along a dimension corresponding to a direction of the directed acyclic diagnostic graph data.

Clause 20. The computer-readable storage device of any of clauses 17, 18, or 19, wherein the instructions are further executable to determine whether nodes in a grid line along a dimension corresponding to a direction of the directed acyclic diagnostic graph data overlap with nodes in an adjacent grid line, and combine the grid line and the adjacent grid line when no nodes in the grid line overlap with nodes in the adjacent grid line.

It will be understood that the configurations and/or approaches described herein are exemplary in nature, and that these specific embodiments or examples are not to be considered in a limiting sense, because numerous variations are possible. The specific routines or methods described herein can represent one or more of any number of processing strategies. As such, various acts illustrated and/or described can be performed in the sequence illustrated and/or described, in other sequences, in parallel, or omitted. Likewise, the order of the above-described processes can be changed.

To the extent that terms "includes," "including," "has," "contains," and variants thereof are used herein, such terms are intended to be inclusive in a manner similar to the term "comprises" as an open transition word without precluding any additional or other elements.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method, the method comprising:
   determining one or more connected groups of nodes in directed acyclic graph data; for each of the one or more connected group of nodes,
   determining a reachability from each node with no inputs to each of one or more nodes with no outputs to determine a plurality of initial node-terminal node pairs, and
   for each initial node-terminal node pair, determining a path from an initial node to a terminal node of the initial node-terminal node pair;
   initializing a grid based upon the determined paths for the connected groups of nodes, the grid comprising grid locations defined by intersections of grid lines along a first dimension and grid lines along a second dimension;
   placing each node at a corresponding initial grid location, and placing edges between nodes based upon the determined paths to form an initial grid representation;
   modifying the initial grid representation via a cost function by moving each of one or more nodes to form a modified grid representation based upon improving the cost function; and
   outputting the modified grid representation for display.

2. The method of claim 1, wherein each of the one or more connected group of nodes comprises one or more node types.

3. The method of claim 2, wherein the directed acyclic graph data comprises diagnostic data, and the one or more node types include one or more of test nodes, function nodes, and failure mode nodes.

4. The method of claim 2, further comprising,
for each determined path, labeling each node in the determined path with a label value based upon a number of steps to the node from a corresponding initial node of a same node type in the determined path,
wherein initializing the grid comprises, for each node type of the one or more node types, setting a number of grid lines along the first dimension based upon a maximum label value for all nodes of the node type over all determined paths, and
wherein placing each node at the corresponding initial grid location comprises assigning each node of the node type to a grid location comprising a first index based upon the label value of the node and a second index that is unique under the first index.

5. The method of claim 1, wherein modifying comprises applying a penalty term based on a summed geometric length of edges in the grid.

6. The method of claim 1, wherein modifying comprises applying a penalty term based on a number of edge crossings.

7. The method of claim 1, wherein modifying comprises applying a penalty term based on a number of edges that have both endpoints at a same index along a dimension corresponding to a direction of the directed acyclic graph data.

8. The method of claim 1, wherein for each initial node-terminal node pair, determining a path comprises determining a shortest path from the initial node to the terminal node of the initial node-terminal node pair.

9. The method of claim 1, further comprising determining whether nodes in a grid line along a dimension corresponding to a direction of the directed acyclic graph data overlap with nodes in an adjacent grid line, and combining the grid line and the adjacent grid line when no nodes in the grid line overlap with nodes in the adjacent grid line.

10. A computing device, comprising:
one or more processors; and
storage comprising instructions executable by the one or more processors to:
obtain directed acyclic graph data;
determine one or more connected groups of nodes, wherein each connected group of nodes comprises one or more node types;
for each of the one or more connected group of nodes,
determine a reachability from each node with no inputs to each of one or more nodes with no outputs to determine a plurality of initial node-terminal node pairs, and
for each initial node-terminal node pair, determine a path from an initial node to a terminal node of the initial node-terminal node pair;
initialize a grid based upon the determined paths, the grid comprising grid locations defined by intersections of grid lines along a first dimension and grid lines along a second dimension;
place each node at a corresponding initial grid location, and place edges between nodes based upon the determined paths to form an initial grid representation;
modify the initial grid representation via a cost function by moving each of one or more nodes to a different grid location to form a modified grid representation based upon improving the cost function; and
output the modified grid representation for display.

11. The computing device of claim 10, wherein the instructions are executable to, for each initial node-terminal node pair, determine a path by determining a shortest path from the initial node to the terminal node of the initial node-terminal node pair.

12. The computing device of claim 10, wherein the instructions are further executable to,
for each determined path, label each node in the determined path with a label value based upon a number of steps to the node from a corresponding initial node of a same node type in the determined path,
wherein the instructions executable to initialize the grid are executable to, for each node type, set a number of grid lines along the first dimension based upon a maximum label value for all nodes of the node type over all determined paths, and
wherein the instructions executable to place each node at the corresponding initial grid location are executable to assign each node of the node type to a grid location comprising a first index based upon the label value of the node and a second index that is unique under the first index.

13. The computing device of claim 10, wherein the instructions are executable to modify by applying a penalty term based on a summed geometric length of edges in the grid.

14. The computing device of claim 10, wherein the instructions are executable to modify by applying a penalty term based on a number of edge crossings.

15. The computing device of claim 10, wherein the instructions are executable to modify by applying a penalty term based on edges having endpoints in a same index along a dimension corresponding to a direction of the directed acyclic graph data.

16. The computing device of claim 10, wherein the instructions are further executable to determine whether nodes in a grid line along a dimension corresponding to a direction of the directed acyclic graph data overlap with nodes in an adjacent grid line, and combine the grid line and the adjacent grid line when no nodes in the grid line overlap with nodes in the adjacent grid line.

17. A non-transitory computer-readable storage device comprising instructions that are executable by a computing device to:
obtain directed acyclic diagnostic graph data, the directed acyclic diagnostic graph data comprising nodes comprising one or more of test nodes, function nodes, and failure mode nodes;
determining one or more connected groups of nodes;
for each connected group of nodes:
determine a reachability from each node with no inputs to each of one or more nodes with no outputs to determine a plurality of initial node-terminal node pairs, and
for each initial node-terminal node pair, determine a path from an initial node to a terminal node of the initial node-terminal node pair;
initialize a grid based upon the determined paths, the grid comprising grid locations defined by intersections of grid lines along a first dimension and grid lines along a second dimension;

place each node at a corresponding initial grid location, and place edges between nodes based upon the determined paths to form an initial grid representation;

modify the initial grid representation via a cost function by moving each of one or more nodes to a different grid location to form a modified grid representation based upon improving the cost function; and output the modified grid representation for display.

18. The non-transitory computer-readable storage device of claim 17, wherein the instructions are further executable to, for each determined path, label each node in the determined path with a label value comprising a number of steps from a corresponding initial node of a same node type in the determined path, wherein the instructions executable to initialize the grid comprises, for each node type, setting a number of grid lines along the first dimension based upon a maximum label value for all nodes of the node type over all determined paths, and wherein placing each node at the corresponding initial grid location comprises assigning each node of the node type to a grid location comprising a first index based upon the label value of the node and a second index that is unique under the first index.

19. The non-transitory computer-readable storage device of claim 17, wherein the instructions are executable to modify by applying one or more of a first penalty term based on a summed geometric length of edges in the grid, a second penalty term based on a number of edge crossings, and a third penalty term based on edges having endpoints in a same index along a dimension corresponding to a direction of the directed acyclic diagnostic graph data.

20. The non-transitory computer-readable storage device of claim 17, wherein the instructions are executable to, for each initial node-terminal node pair, determine a path by determining a shortest path from the initial node to the terminal node of the initial node-terminal node pair.

* * * * *